(12) United States Patent
Shemer et al.

(10) Patent No.: US 12,175,232 B2
(45) Date of Patent: Dec. 24, 2024

(54) AUTOMATIC CANARY DEPLOYMENTS WITH STATIC ANALYSIS AND CODE INSTRUMENTATION

(71) Applicant: Dell Products L.P., Round Rock, TX (US)

(72) Inventors: Jehuda Shemer, Kfar Saba (IL); Boris Shpilyuck, Ashdod (IL); Igor Dubrovsky, Be'er Sheva (IL)

(73) Assignee: DELL PRODUCTS L.P., Round Rock, TX (US)

( * ) Notice: Subject to any disclaimer, the term of this patent is extended or adjusted under 35 U.S.C. 154(b) by 15 days.

(21) Appl. No.: 17/935,275

(22) Filed: Sep. 26, 2022

(65) Prior Publication Data

US 2024/0103831 A1 Mar. 28, 2024

(51) Int. Cl.
*G06F 8/65* (2018.01)

(52) U.S. Cl.
CPC ...................... *G06F 8/65* (2013.01)

(58) Field of Classification Search
CPC .................................. G06F 8/60–66
USPC .................................. 717/168–178
See application file for complete search history.

(56) References Cited

U.S. PATENT DOCUMENTS

| 7,370,318 | B1 | 5/2008 | Howe et al. |
| 8,020,146 | B2 | 9/2011 | Hudson, Jr. |
| 9,268,663 | B1 | 2/2016 | Siddiqui et al. |
| 10,019,255 | B1* | 7/2018 | Greenfield .......... G06F 11/1433 |
| 2008/0148225 | A1 | 6/2008 | Sarkar et al. |
| 2017/0351597 | A1 | 12/2017 | Baset et al. |
| 2020/0358846 | A1* | 11/2020 | Bonas ................. H04L 67/1001 |
| 2022/0156059 | A1 | 5/2022 | Schumaker |
| 2022/0197606 | A1 | 6/2022 | Rodgers et al. |

(Continued)

FOREIGN PATENT DOCUMENTS

| CN | 108762768 A | 11/2018 |
| CN | 111279319 A | 6/2020 |

OTHER PUBLICATIONS

Tarvo, Alexander, et al., CanaryAdvisor: a statistical-based tool for canary testing (demo), ISSTA 2015: Proceedings of the 2015 International Symposium on Software Testing and Analysis, Jul. 2015, 5 pages, [retrieved on Mar. 4, 2024], Retrieved from the Internet: <URL:http://dl.acm.org/>.*

(Continued)

*Primary Examiner* — Geoffrey R St Leger
(74) *Attorney, Agent, or Firm* — Amin, Turocy & Watson, LLP

(57) ABSTRACT

A system can identify that computer code that is executable to operate at least one microservice that is part of a group of microservices has been modified. The system can determine complexity data representative of a complexity of changes to the computer code. The system can determine conditions under which the changes to the computer code are invoked based on at least one of performing a static analysis of the computer code or instrumenting the computer code. The system can generate a progressive deployment plan for the at least one microservice based on the complexity of changes. The system can progressively direct traffic to the at least one microservice based on the progressive deployment plan, and the conditions under which the changes to the computer code are invoked.

20 Claims, 11 Drawing Sheets

(56) References Cited

U.S. PATENT DOCUMENTS

2023/0081153 A1* 3/2023 Boguslavsky ...... G06F 11/3476 717/174
2023/0342122 A1 10/2023 Shpilyuck et al.

OTHER PUBLICATIONS

Schermann, Gerald, et al., Bifrost-Supporting Continuous Deployment with Automated Enactment of Multi-Phase Live Testing Strategies, Middleware '16: Proceedings of the 17th International Middleware Conference, Nov. 2016, 14 pages, [retrieved on Mar. 4, 2024], Retrieved from the Internet: <URL:http://dl.acm.org/>.*

Shemer, et al. "Automatic Canary Deployments with Dynamically Updating Call Thresholds" U.S. Appl. No. 17/935,325, filed Sep. 26, 2022, 52 pages.

Shemer, et al. "Automatic Canary Deployments with Analyzing Third Party Libraries" U.S. Appl. No. 17/935,335, filed Sep. 26, 2022, 50 pages.

Office Action mailed Apr. 26, 2023 for U.S. Appl. No. 17/660,123, 53 pages.

Office Action mailed Sep. 13, 2023 for U.S. Appl. No. 17/660,123, 87 pages.

Notice of Allowance mailed Jan. 31, 2024 for U.S. Appl. No. 17/660,123, 105 pages.

Office Action mailed Mar. 7, 2024 for U.S. Appl. No. 17/935,335, 50 pages.

Shpilyuck et al. "Canary Deployments Based On Configuration Complexity In Containerized Environments" U.S. Appl. No. 18/643,897, filed Apr. 23, 2024, 56 pages.

Shpilyuck et al. "Detecting Configuration Issues During Pre-Canary Deployment" U.S. Appl. No. 18/645,009, filed Apr. 24, 2024, 55 pages.

Notice of Allowance mailed May 16, 2024 for U.S. Appl. No. 17/660,123, 79 pages.

Office Action mailed May 23, 2024 for U.S. Appl. No. 17/935,325, 13 pages.

Office Action mailed Jul. 9, 2024 for U.S. Appl. No. 17/935,335, 26 pages.

Notice of Allowance mailed Sep. 17, 2024 for U.S. Appl. No. 17/935,335, 34 pages.

* cited by examiner

300

PERFORMING STATIC ANALYSIS OF A CHANGE TO CODE 904

DETERMINING A NUMBER OF TIMES THAT THE CHANGE TO THE CODE IS INVOKED BASED ON THE STATIC ANALYSIS OF THE CHANGE TO THE CODE 906

US 12,175,232 B2

AUTOMATIC CANARY DEPLOYMENTS WITH STATIC ANALYSIS AND CODE INSTRUMENTATION

BACKGROUND

Computer programs that are operating in production can be updated, and these updated versions of the programs can be introduced into production.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify that computer code that is executable to operate at least one microservice that is part of a group of microservices has been modified. The system can determine complexity data representative of a complexity of changes to the computer code. The system can determine conditions under which the changes to the computer code are invoked based on at least one of performing a static analysis of the computer code or instrumenting the computer code. The system can generate a progressive deployment plan for the at least one microservice based on the complexity of changes. The system can progressively direct traffic to the at least one microservice based on the progressive deployment plan, and the conditions under which the changes to the computer code are invoked.

An example method can comprise determining, by a system comprising a processor, a complexity of changes to an executable program that corresponds to a microservice of a group of microservices. The method can further comprise determining conditions under which the changes to the executable program are invoked, based on at least one of a result of performing static analysis of instructions that correspond to the executable program, or instrumenting the instructions or the executable program. The method can further comprise generating, by the system, a progressive deployment plan for the microservice based on the complexity of changes. The method can further comprise directing, by the system, traffic to the microservice based on the progressive deployment plan and the conditions under which the changes to the executable program are invoked.

An example non-transitory computer-readable medium can comprise instructions that, in response to execution, cause a system comprising a processor to perform operations. These operations can comprise determining a complexity of changes to executable instructions that correspond to an updated version of a computer program. These operations can further comprise determining conditions under which the changes to the executable instructions are invoked, based on at least one of a result of performing a static analysis of the executable instructions, or instrumenting the executable instructions or the updated version of the computer program, wherein a current version of the computer program is operating. These operations can further comprise generating a progressive deployment plan for the updated version of the computer program based on the complexity of changes. These operations can further comprise dividing computer traffic between the updated version of the computer program and the current version of the computer program based on the progressive deployment plan and the conditions under which the changes to the executable instructions are invoked.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
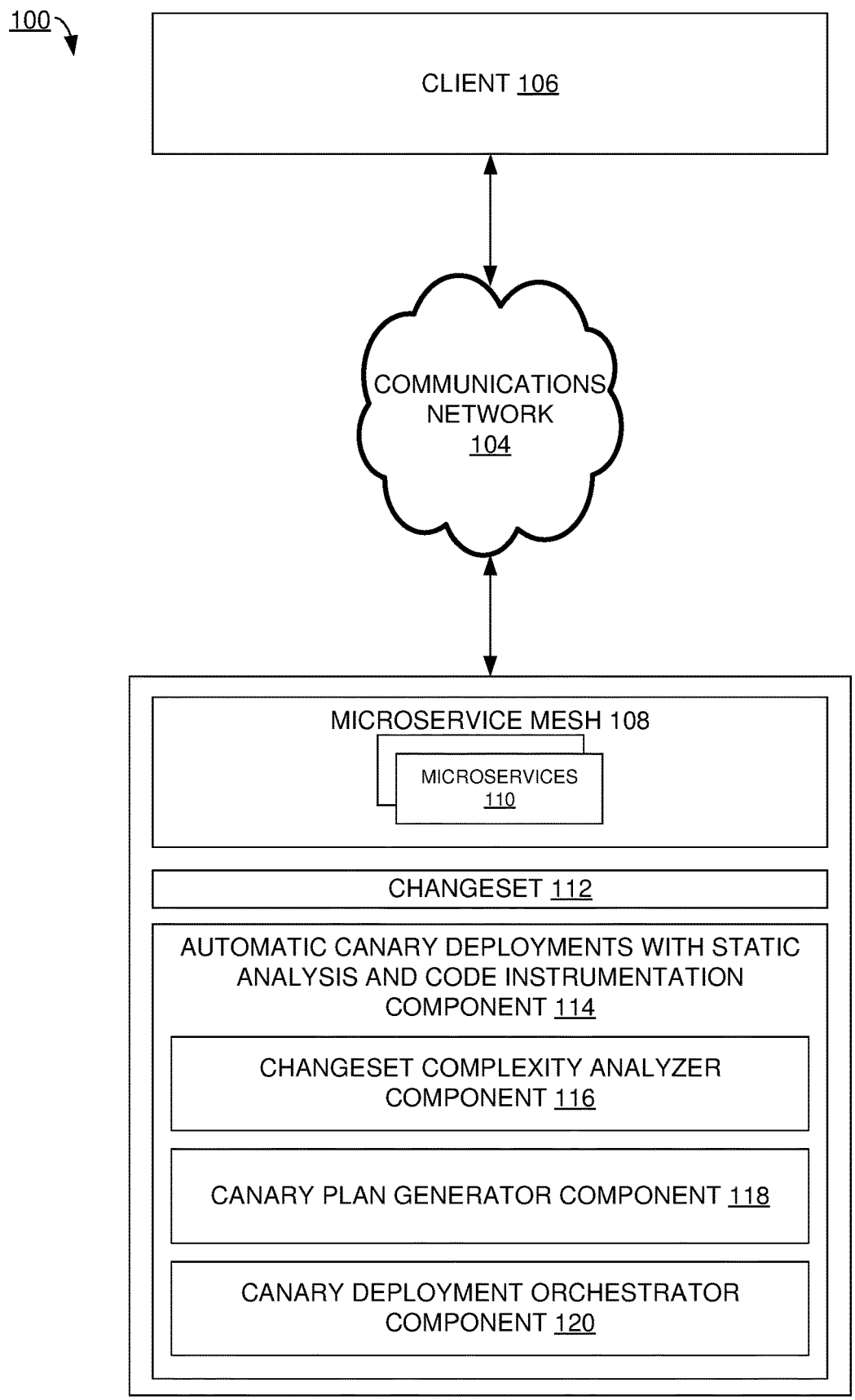
FIG. 1 illustrates an example system architecture that can facilitate automatic canary deployments with static analysis and code instrumentation, in accordance with an embodiment of this disclosure.

The present techniques can be implemented to facilitate automating upgrade processes of live computer systems. In contemporary containerized environments (where a service is implemented with a group of microservices that operate in respective containers), new changes can be introduced in the form of "canary deployments." In a canary deployment, a production version of a microservice and a new version of a microservice (which can be referred to as a canary version) can be active concurrently.

It can be that, initially, the canary version receives a small portion of traffic in order to minimize damage in case of any problems. Then, if no problems are encountered, an amount of traffic to the canary version can be gradually increased by a canary deployment operator until all traffic is switched to the canary version. After that, the "old" production version can be decommissioned, and the canary version can be treated as the production version.

In canary deployment scenarios such as this, the present techniques can be implemented to determine how much traffic should be directed to the canary version, and at what rate should traffic that is directed to the canary version be increased.

A problem with prior approaches can be that canary deployment operators can define an amount of traffic that will be forwarded to a canary version of a microservice at each step of a canary deployment manually, and without relation to a complexity of a committed changeset that is used to create the canary version. Therefore, simple changes can take too much time to deploy. And vice versa—a complex change may receive significant amounts of traffic too quickly, which can lead to too many users being affected by possible issues.

According to the present techniques, upon code submission, a complexity of a changeset can be analyzed, and a corresponding canary deployment plan can be created based on the changeset's complexity. The plan can define a number of steps and an amount of traffic that will be forwarded to a canary version of a microservice at each of multiple steps. Where a changeset is more complex, progress toward a full switch to a canary version can be more gradual and more verified.

Prior approaches to canary deployments can require manual orchestration. In some examples, a canary deployment operator decides at each step what percent of traffic to forward to a canary version. In a case where there are a few different computing clusters and hundreds of microservices, this can be significant and error-prone manual labor.

Prior approaches to canary developments can have a "blast radius" that is too wide. Where a service comprises hundreds or thousands of microservices, it can be difficult to analyze every changeset manually, and provide a corresponding deployment plan that takes into consideration changeset complexity. As a result, it can be that a manual averaged plan is adopted for all canary deployments. Implementing an average plan for all deployments can mean that the deployment process is too fast for some complex changesets, thus affecting too many users in case of possible issues.

Prior approaches to canary developments can utilize too slow of a propagation time. Where a manual averaged plan is adopted for all canary deployments (as described above), for simple changesets, the deployment progress can be too slow. This can negatively impact feature rollout time.

The present techniques can be implemented to facilitate providing automatic canary deployments, thus reducing manual and error-prone labor. Canary deployments can be orchestrated according to a canary deployment plan that takes into consideration a complexity of a changeset. This approach can achieve an acceptable balance between passing deployments through at a reasonable rate, while also not affecting too many users in a case of a problem with the deployed changeset.

According to the present techniques, a changeset complexity analyzer can analyze a changeset's complexity based on a group of metrics. A canary plan generator can generate a canary deployment plan based on the changeset's complexity. A canary deployment orchestrator can orchestrate the canary deployment plan.

In some examples, the present techniques can be implemented where an existing microservice, or group of microservices, has undergone changes. The new versions of the microservice(s) can be deployed in parallel with older versions that are currently in production. Traffic portions between the old and the new versions can be progressively orchestrated.

In another example, an additional microservice, or group of microservices, can be deployed or removed as part of a changeset that can include some existing deployed microservices. Similar to the above, traffic can be progressively directed to this new group of microservices.

In some examples, static analysis and/or code instrumentation can be implemented as part of a canary deployment plan to determine that a change to code is executed a certain number of times in a canary deployment step.

Consider this example pseudocode:

```
Function doSomething(int targetValue) {
  If (targetValue <100) {
    doX( );
  }
  else { //This is a change to the code
    doY( );
  }
}
```

As part of a canary test, it can be desired to expose the new code 1,000 times. It can be that an approach that looks at an application programming interface that calls doSomething( ) and monitors 1,000 calls to doSomething( ) is inaccurate. It could be that in all 1,000 of those calls, targetValue was equal to 5, so the new code was never executed.

Static code analysis can reveal this situation, and can determine that only calls where targetValue>=100 will trigger the code, so count only those application programming interface calls.

In other examples (or in combination with static analysis), instrumentation can be used to determine how often a change in code is executed. Instrumentation can generally change code (source or compiled code) to add tracking info, such as in this example pseudocode:

```
Function doSomething(int target Value) {
  If (targetValue <100) {
    doX( );
  }
  else { //This is a change to the code
    TRACKER(INCREASE_DOSOMETHING_COUNTER);
    //Instrumented code
    doY( );
  }
}
```

In some examples, this instrumentation code can be automatically inserted into code where a change is identified (such as by comparing an updated version of code with a prior version of code, and identifying the differences in the two codes as changes). Here, TRACKER(INCREASE_DO_SOMETHING_COUNTER) can increment a counter each time that it is executed, and this counter can track how many times doY( ) is executed (since both TRACKER(INCREASE_DO_SOMETHING_COUNTER) and doY( ) will be executed together, as there is no branching logic between the two instructions).

In some examples, instrumentation code can be removed or disabled after a canary deployment is completed (and the new code is in production). This can improve performance of the code relative to continuing to execute the instrumentation code as part of the code.

Example Architectures

FIG. 1 illustrates an example system architecture 100 that can facilitate automatic canary deployments with static analysis and code instrumentation, in accordance with an embodiment of this disclosure.

System architecture 100 comprises server 102, communications network 104, and client 106. In turn, server 102 comprises microservices mesh 108, changeset 112, and automatic canary deployments with static analysis and code instrumentation component 114. Microservices mesh 108 comprises microservices 110. automatic canary deployments with static analysis and code instrumentation component 114 comprises changeset complexity analyzer component 116, canary plan generator component 118, and canary deployment orchestrator component 120.

Figure 11:
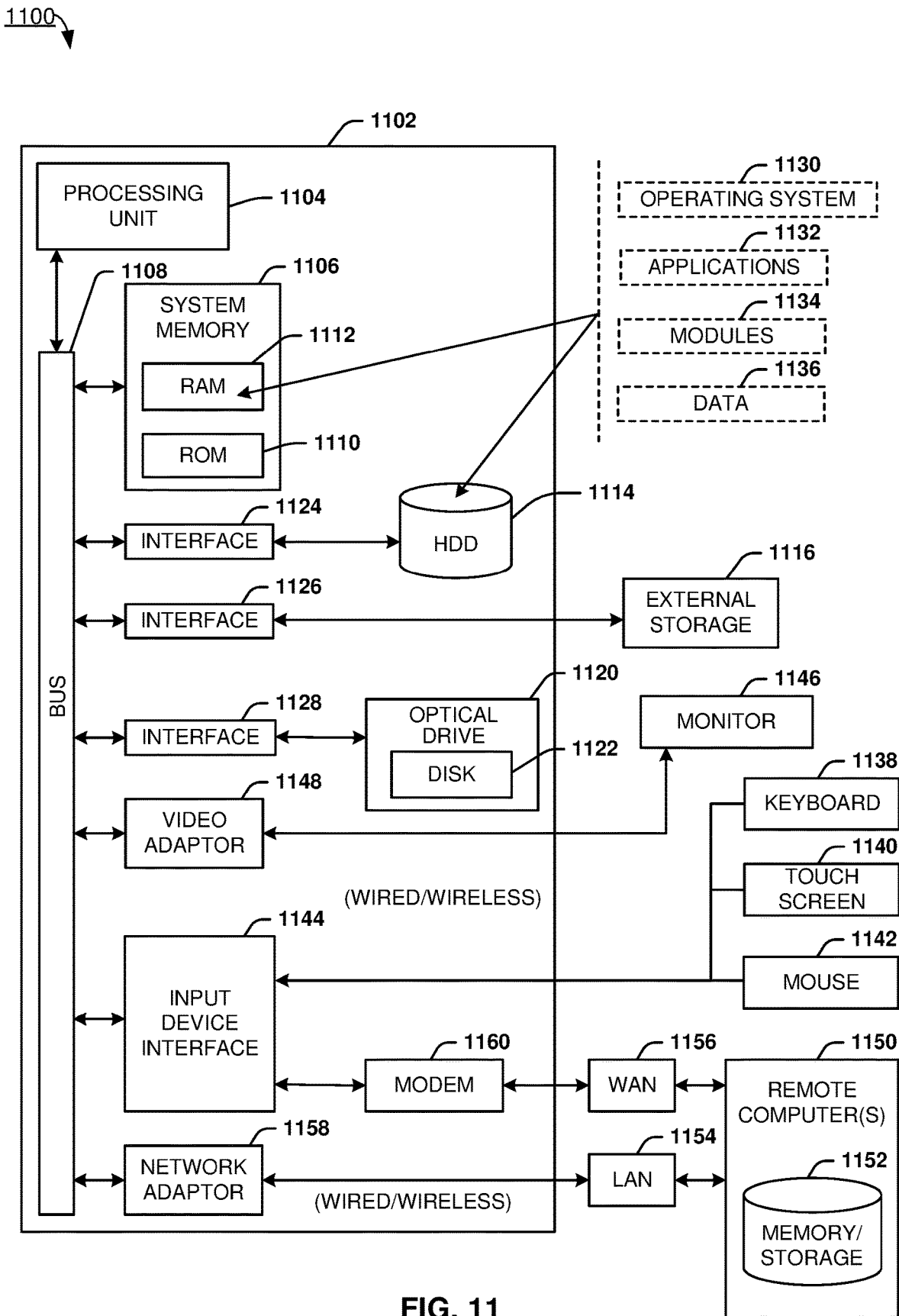
FIG. 11 illustrates an example block diagram of a computer operable to execute an embodiment of this disclosure.

Each of server 102 and/or client 106 can be implemented with part(s) of computing environment 1100 of FIG. 11. Communications network 104 can comprise a computer communications network, such as the Internet.

Microservices 110 can operate collectively to provide a computing service that is accessible by client 106 via communications network 104. Microservices 110 can be containerized, where each microservice operates in a separate computing container. This can be referred to as a "containerized environment."

Over time, an entity that creates microservices 110 can update computing code used for the microservices. This updated code can be stored as changeset 112. It can be that an entity that manages microservices 110 wants to perform a progressive deployment (sometimes referred to as a "canary deployment") of gradually increasing traffic to a new version of a particular microservice, and from an older version of that particular microservice that is currently in production. This can be to identify errors with the new version before the new version serves all users.

Performing such a canary deployment can be performed by automatic canary deployments with static analysis and code instrumentation component 114. Changeset complexity analyzer component 116 can determine a complexity of changeset 112. Canary plan generator component 118 can determine a plan for progressively deploying the new version of the microservice based on the result of changeset complexity analyzer component 116. In some examples, canary plan generator component 118 can perform static analysis and/or instrumentation on the changeset to determine conditions under which code of the changeset is executed.

Canary deployment orchestrator component 120 can implement a progressive deployment of the new version of the microservice based on the plan determined by canary plan generator component 118.

In some examples, canary deployment orchestrator component 120 can use the information about conditions under which code of the changeset is executed to determine how many times code of the changeset is executed. For example, it can be determined that an application programming interface call causes code of the changeset to be executed when an input value is less than 100. So, when the application programming interface call is invoked with an input value of less than 100, canary deployment orchestrator component 120 can determine that code of the changeset is executed. And, when the application programming interface call is invoked with an input value of 100 or more, canary deployment orchestrator component 120 can determine that code of the changeset is not executed.

In some examples, automatic canary deployments with static analysis and code instrumentation component 114 can implement part(s) of the process flows of FIGS. 6-10 to facilitate automatic canary deployments with static analysis and code instrumentation.

It can be appreciated that system architecture 100 is one example system architecture for proactive prevention of data unavailability and data loss, and that there can be other system architectures that facilitate automatic canary deployments with static analysis and code instrumentation.

Figure 2:
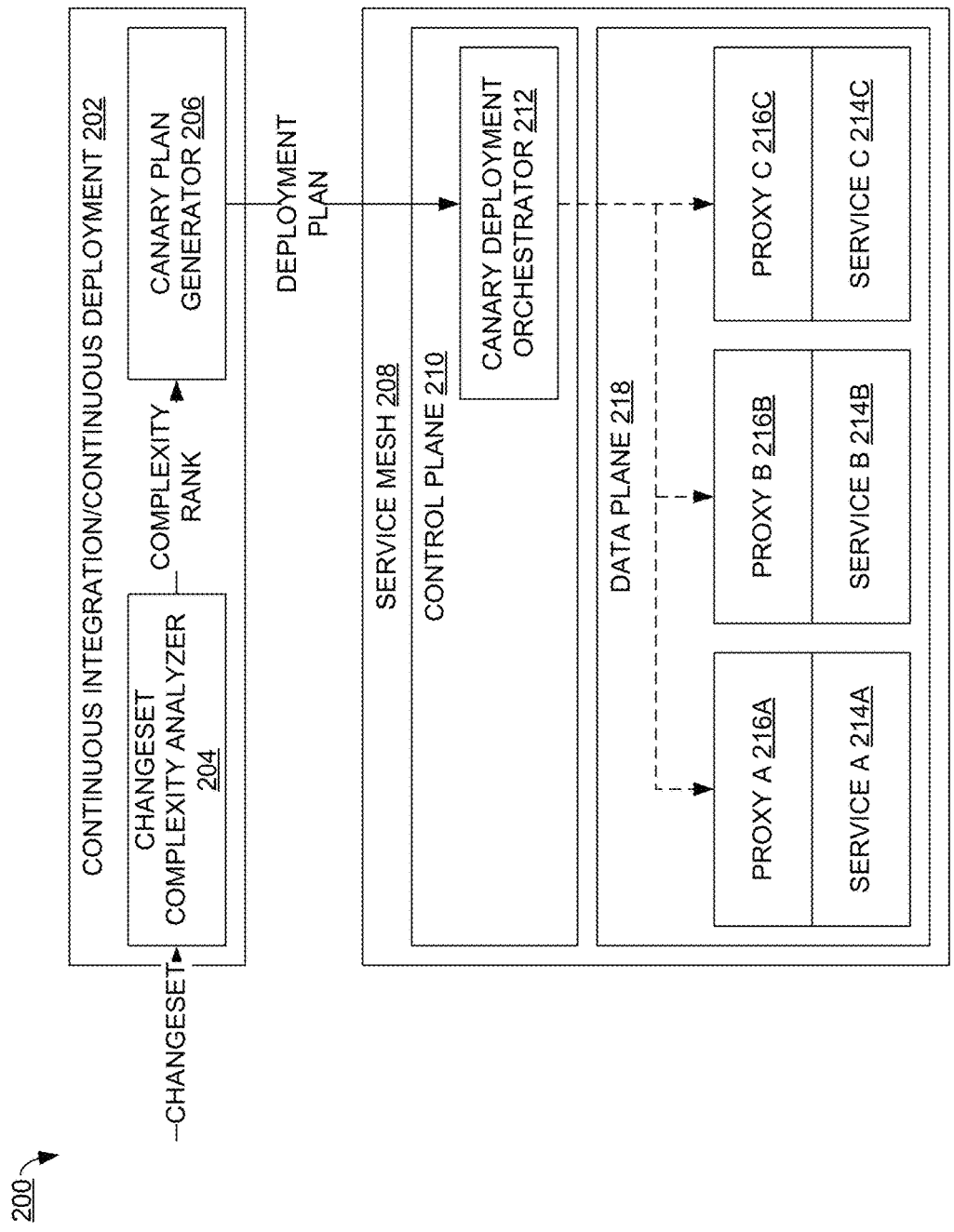
FIG. 2 illustrates another example system architecture that can facilitate automatic canary deployments with static analysis and code instrumentation, in accordance with an embodiment of this disclosure.

FIG. 2 illustrates another example system architecture 200 that can facilitate automatic canary deployments with static analysis and code instrumentation, in accordance with an embodiment of this disclosure. In some examples, part(s) of system architecture 200 can be implemented by system architecture 100 to facilitate automatic canary deployments with static analysis and code instrumentation.

System architecture 200 comprises continuous integration/continuous deployment 202, changeset complexity analyzer 204 (which can be similar to changeset complexity analyzer component 116 of FIG. 1), canary plan generator 206 (which can be similar to canary plan generator component 118), service mesh 208, control plane 210, canary deployment orchestrator 212 (which can be similar to canary deployment orchestrator component 320), service A 214A, service B 214B, service C 214C, proxy A 216A, proxy B 216B, proxy C 216C, and data plane 218.

Continuous integration/continuous deployment 202 can comprise a computer component that facilitates building, testing and deployment of programs. Service mesh 208 can comprise a computer component that facilitates an infrastructure layer for facilitating service-to-service communications between services or microservices (e.g., service 214A-C), using a proxy (e.g., proxy 216A-C). Control plane 210 can comprise a part of service mesh 208 that manages and configures proxies. Data plane 218 can comprise a part of service mesh 208 that facilitates communication between services and load balancing between multiple instances of a given service.

In some examples, the present techniques can encompass analyzing a changeset's complexity; generating a canary deployment plan based on the changeset's complexity; and automatically orchestrating the canary deployment based on the generated canary deployment plan.

A system that implements the present techniques can comprise changeset complexity analyzer 204, canary plan generator 206, and canary deployment orchestrator 212. System architecture 200 presents these components logically, and it can be appreciated that there can be other systems that implement the present techniques in a different manner.

Changeset complexity analyzer 204 can be incorporated into an ecosystem of continuous integration/continuous deployment (CI/CD) 202, and upon submission of a changeset (e.g., changeset 112 of FIG. 1), determine a changeset's complexity, then produce a complexity rank (e.g., a numeric value between 1 and 100) according to the corresponding complexity.

Canary plan generator 206 can be incorporated into an ecosystem of continuous integration/continuous deployment 202. Canary plan generator 206 can use a complexity rank produced by changeset complexity analyzer 204, and generate a corresponding canary deployment plan.

A canary deployment plan can comprise a list of steps, and conditions to move to a next step, in a canary deployment. Each step can identify a counter of a minimum number of requests that should be handled at this step; a minimum amount of time to stay in this step; and/or other conditions.

A canary deployment plan can indicate both a minimum number of calls processed and a minimum amount of time that passes to move to a next step in a canary deployment. For example, a canary deployment plan can indicate a minimum of both 1,000 requests and 90 seconds. That is, the process can stay in this step until at least 1,000 requests have been processed, and at least 90 seconds have passed in this step. This can ensure that exposure is significant, and that the system has had enough time to propagate a result. Where either parameter is defined as 0 in a canary deployment plan, it can indicate that only one aspect is the trigger to move to a next step.

In some examples, defining each step separately can be performed, and can allow for granular control. In other examples, a canary plan generator can simplify a generation of steps by using a function to define the steps, and fixed parameters for the rest. Such a function can be a monotonically increasing function, as depicted in graph 400 of FIG. 4.

Additionally, with a canary deployment plan, a fixed number of requests and a fixed amount of time per step can be used. In other examples, these values can be a function of the step number—e.g., 1,000 requests for step 1, 2,000 requests for step 2, etc. (and a similar approach for the time values).

In some examples, a basic canary deployment plan can therefore be made up of a triplet—[#steps, #requests, #time]. Expressed in more detail, this can be, [number of steps, minimum number of requests to be forwarded to the canary version per step, minimum time to stay per step].

In some examples, a canary deployment plan can have additional parameters to govern behavior of corresponding functions.

The present examples, can generally involve using an Nth root function (similar to function 408 of FIG. 4), and a fixed number of requests and amount of time for a step.

For example, a canary deployment plan of [7, 5,000, 30] can mean that there are 7 steps, and in order to move to the next step both 5,000 requests must be forwarded to the canary version of the microservice, and at least 30 seconds must elapse in that step. The percentage of traffic that will be forwarded to the canary version for each step is, 1.93%, 3.73%, 7.20%, 11.9%, 26.82%, 51.8%, 100%. That is, as there are 7 steps in this example, each step is based on the $7^{th}$ root of 100, e.g., $100^{(1/7)}$, $100^{(2/7)}$, $100^{(7/7)}$ (which is 100%).

Combined together, in some examples, the higher the complexity rank, the more steps there will be, and the slower the percentage of request forwarded to the canary version per each step and time in each is. This approach can allow achieving an acceptable balance between passing deployments through at a reasonable rate, but also not affecting too many users in case there is a problem with the changeset.

In some examples, as described herein, a number of steps can be automatically derived, and a complete canary deployment plan can also be automatically derived as a result.

Canary deployment orchestrator 212 can be incorporated into an ecosystem of service mesh 208.

Service mesh 208 can generally comprise a dedicated infrastructure layer that allows the transparent addition of capabilities like observability, traffic management, security, and canary deployments, without adding them to the code of a specific service. In some examples, in order to support canary deployments, a canary deployment operator can use a service mesh's ability to split traffic between production and canary versions at a given proportion. However, this approach can be a manual process, with the proportion itself specified by the canary deployment operator.

Upon a continuous integration/continuous deployment's pipeline completion, canary deployment orchestrator 212 can get a canary deployment plan produced by canary plan generator 206, and automatically execute it step-by-step. Canary deployment orchestrator 212 can verify that, per each step, the relevant percentage of requests are forwarded to the canary version. Once the required number of request per step are achieved, and the required time has passed, canary deployment orchestrator 212 can move to a next step (with a higher canary traffic percentage), and so on, until everything is switched to the canary version (where the canary version is operating successfully).

In the example of system architecture 200, changeset complexity analyzer 204 and canary plan generator 206 are incorporated into an ecosystem of continuous integration/continuous deployment 202, while canary deployment orchestrator 212 is incorporated into a control plane ecosystem of the service mesh 208. Changeset complexity analyzer 204 can receive a changeset, determine its complexity rank, and pass that information to canary plan generator 206. Canary plan generator 206 can generate a canary deployment plan, and pass the canary deployment plan to canary deployment orchestrator 212, which, in turn, can instruct the service mesh's proxies (e.g., proxy 216A-C) to split the traffic between canary versions and production versions of a service (e.g., service 214A-C) in proportion as defined by the canary deployment plan.

Figure 3:
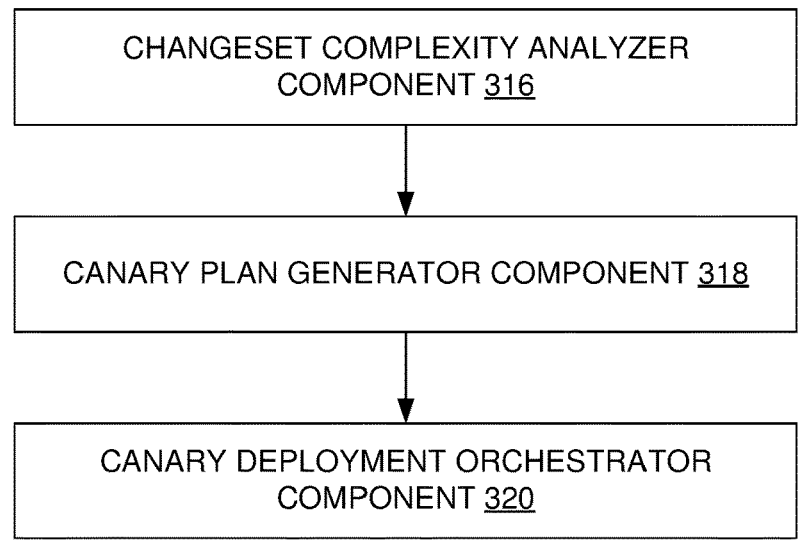
FIG. 3 illustrates another example system architecture that can facilitate automatic canary deployments with static analysis and code instrumentation, in accordance with an embodiment of this disclosure.

FIG. 3 illustrates another example system architecture 300 that can facilitate automatic canary deployments with static analysis and code instrumentation, in accordance with an embodiment of this disclosure.

System architecture 300 changeset complexity analyzer component 316, canary plan generator component 318, and canary deployment orchestrator component 320. Changeset complexity analyzer component 316, canary plan generator component 318, and canary deployment orchestrator component 320 can be similar to changeset complexity analyzer component 116, canary plan generator component 118, and canary deployment orchestrator component 120 of FIG. 1, respectively.

It can be appreciated that system architecture 300 presents an example system architecture according to the present techniques logically, and that there can be other implementations of the present techniques.

In system architecture 300, for a given changeset for one or more microservices (e.g., changeset 112 of FIG. 1), changeset complexity analyzer component 316 can determine a complexity of the changeset. Canary plan generator component 318 can determine a plan for progressively deploying the new version of the microservice based on the result of changeset complexity analyzer component 316. Canary deployment orchestrator component 320 can implement a progressive deployment of the new version of the microservice based on the plan determined by canary plan generator component 318.

Figure 4:
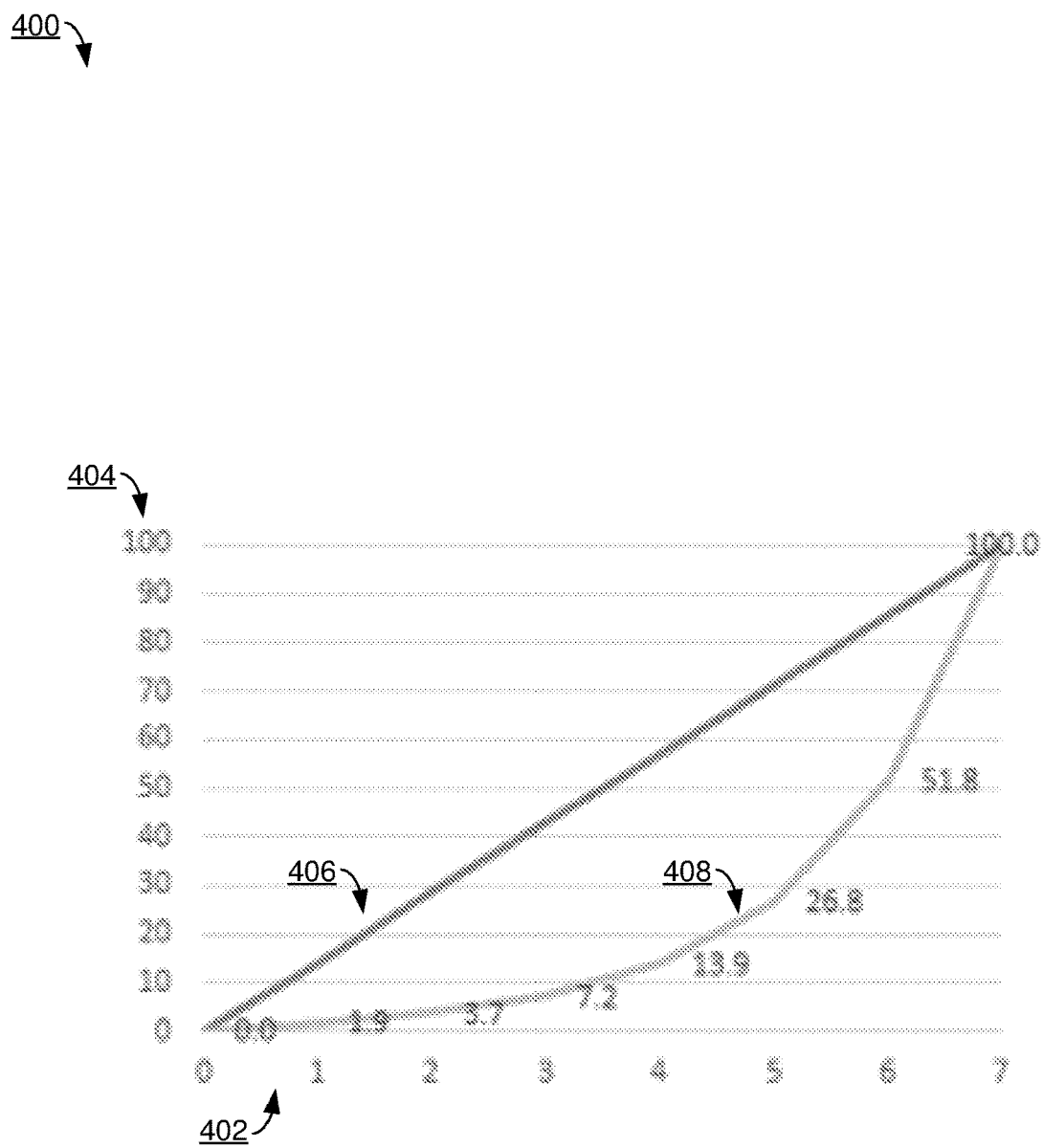
FIG. 4 illustrates an example graph for increasing traffic directed to a canary version, and that can facilitate automatic canary deployments with static analysis and code instrumentation, in accordance with an embodiment of this disclosure.

FIG. 4 illustrates an example graph 400 for increasing traffic directed to a canary version, and that can facilitate automatic canary deployments with static analysis and code instrumentation, in accordance with an embodiment of this disclosure.

In some examples, information in graph 400 can be used by canary plan generator component 118 of FIG. 1 to determine a percentage of traffic to direct to a new version of a microservice (compared with a current, production version of the microservice) at various steps in a canary deployment.

Graph 400 comprises X-axis 402 (indicating a step number in a deployment), and Y-axis 404 (indicating a percentage of traffic directed to the new version of the microservice). Graphed on graph 400 are function 406 (displaying a linear progression in directing traffic to the new version of the microservice) and function 408 (displaying a Nth root progression in directing traffic to the new version of the microservice).

For example, the function can be a linear function, where there are N steps, and an additional D percent of traffic is sent to the canary deployment in each step. The last step can be 100% of traffic. In an example of six steps with 10% jumps, the respective percentages at each step can be 10%, 20%, 30%, 40%, 50%, and 100%.

In another example, the function can be a Nth root (or exponential) function. There can be N steps, and step K is (Nth root of 100)$^K$. So, after N steps, the value can be 100%. This Nth root function can create a smooth, incremental exposure.

Figure 5:
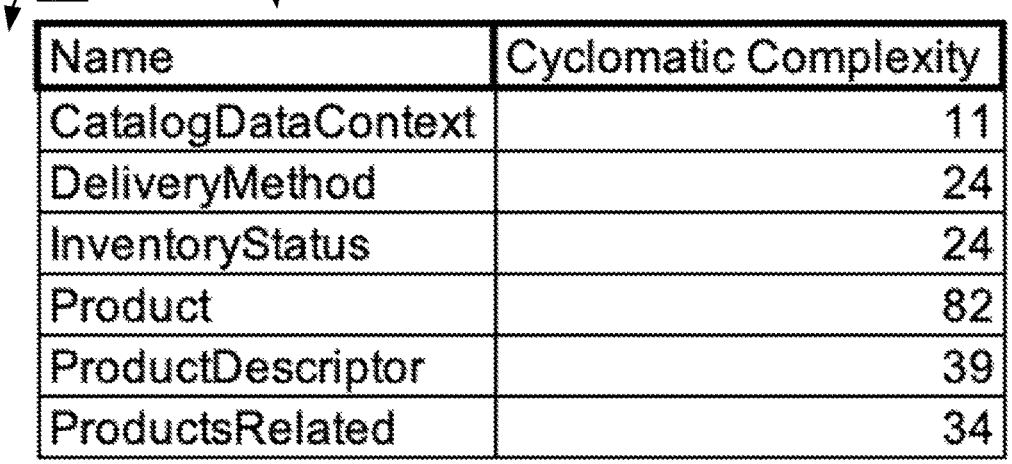
FIG. 5 illustrates an example table of evaluated metrics in determining changeset complexity, and that can facilitate automatic canary deployments with static analysis and code instrumentation, in accordance with an embodiment of this disclosure.

FIG. 5 illustrates an example table 500 of evaluated metrics in determining changeset complexity, and that can facilitate automatic canary deployments with static analysis and code instrumentation, in accordance with an embodiment of this disclosure.

In some examples, information in table 500 can be used by canary plan generator component 118 of FIG. 1 to determine a percentage of traffic to direct to a new version of a microservice (compared with a current, production version of the microservice) at various steps in a canary deployment.

Table 500 comprises rows 502 and columns 504. Each row in rows 502 corresponds to a separate metric. Then, columns in columns 504 identifies the metric, as well as a complexity value.

In some examples, various metrics of a changeset are considered by a changeset complexity analyzer for determining complexity rank. These metrics can include, a number of affected lines of code (LOC); a cyclomatic complexity of the changeset, which can measure a number of linearly independent paths through code of the changeset; a number of affected program classes of the changeset; and a number of representational state transfer (REST) clients affected by the changeset that interact with other microservices. A cyclomatic complexity of the changeset can evaluate the changeset statically, rather than as running code. A cyclometric complexity can generally identify the number of linearly independent paths present in the changeset.

A set of metrics that is evaluated can be considered, and in some examples, additional metrics can be incorporated into a complexity rank determination. In some examples, complexity rank can represent a sum of weighted complexities across all evaluated metrics.

In some examples, for each metric (i), a canary deployment operator can define:

Weight(i)—which can be a relative weight of the metric in total computation. A sum of all weights of all metrics evaluated can be 100.

MaxComplexity(i)—This can be a maximal complexity per metric (i) in total computation. For example, for metric of a number of affected classes, it can be specified that any changeset that has 50 or more changed classes has reached its maximum per this metric, and this metric is set at 50.

MinComplexity(i)—This can be a minimal complexity per metric (i) in total computation. For example, using the number of affected classes metric, above, it can be specified that any changeset that has 3 or fewer changed classes has reached its minimum per this metric, and this metric is set at 3.

RawComplexity(i)—This can be an actual, unnormalized complexity per metric (i) in total computation. Using the number of affected classes metric, where there are 120 affected classes in the actual changeset, the value of RawComplexity(i) can be 120, regardless of a maximum value (as in MaxComplexity(i)) or a minimum value (as in MinComplexity(i)).

Given this, determining a total complexity of a changeset for n metrics can result in a number between 1 and 100, and can be determined as follows:

$$\text{ComplexityRank} = \Sigma_{i=0}^{n} \min(\text{MaxComplexity}(i), \max(\text{RawComplexity}(i), \text{MinComplexity}(i)))/\text{MaxComplexity}(i) * \text{Weight}(i)$$

Under following assumption: $\Sigma_{i=0}^{n} \text{Weight}(i) = 100$

That is, where the raw value is within the maximum and minimum bounds, the raw value is used. And otherwise use the maximum or minimum bound (whichever the raw value is outside). This value is divided by the maximum complexity to normalize it, then multiplied by the weight to weight it. This is done for each evaluated metric, and the evaluated metrics are summed to determine the ComplexityRank.

Values for Weight, MaxComplexity, and MinComplexity can be defined by a canary deployment operator for each metric.

Generating a canary deployment plan based on a changeset's complexity can be implemented as follows. A canary plan generator can take a complexity rank that is determined by the changeset complexity analyzer in order to generate a canary deployment plan.

A canary deployment plan operator can predefine the following parameters. A parameter can be a number of requests per single complexity rank point. This parameter can specify how many requests should be forwarded to a canary version for each complexity rank point in the complexity rank of the changeset.

Another parameter can be a time per single complexity rank point. This parameter can specify how much time should be spent in the canary version step per single complexity rank point.

Another parameter can be a number of requests per step. This parameter can specify how many requests should be forwarded to a canary version per single canary deployment step. This can indicate a total number of steps in a canary deployment plan, where the total number of requests divided by the number of requests per step indicates the number of steps.

Consider the following example where the complexity rank is 100; the number of requests per single complexity rank point is 1,000; the time per single complexity rank point is 6 seconds; and the number of requests per step is 10,000.

In this example, a minimum total number of requests that should be forwarded to a canary version in order to full switch to the canary version is 100*1,000=100,000.

A minimum total time that should be spent in the canary version of the microservice in order to switch fully to the canary version is 100*6=600 seconds.

A number of steps that the canary deployment plan has is 100,000/10,000=10. The time per each step is 600/10=60 seconds.

A canary deployment plan can be summarized as a triplet, [number of steps, number of requests to be forwarded to the canary version per step, time per step]. In this example the triplet is [10, 10000, 60].

That is, in order to be confident in the canary deployment, 10 steps are implemented. In each step, at least 10,000 requests are executed and a minimum of 60 seconds elapses before moving to the next step. The amount of traffic directed to the canary version at each step, using a Nth root function, is 1.58%, 2.51%, 3.98%, 6.31%, 10, 15.85%, 25.12%, 39.81%, 63.1%, 100%. That is, to move from step 3 to step 4, 10,000 requests must be forwarded to the canary version, while forwarding only 3.98% of all traffic to the canary version, and at least 60 seconds must elapse in this step even if enough requests are handled earlier.

Consider another example where the complexity rank is 50; the number of requests per single complexity rank point is 1,000; the time per single complexity rank point is 6 seconds; and the number of requests per step is 10,000.

In this example, a minimum total number of requests that should be forwarded to a canary version in order to full switch to the canary version is 50*1,000=50,000.

A minimum total time that should be spent in the canary version of the microservice in order to switch fully to the canary version is 50*6=300 seconds.

A number of steps that the canary deployment plan has is 50,000/10,000=5. The time per each step is 300/5=60 seconds.

Using the above triplet notation to summarize a canary deployment plan, the triplet here is [5, 10,000, 60].

That is, in order to be confident in the canary deployment, 5 steps are implemented. In each step, at least 10,000 requests are executed and a minimum of 60 seconds elapses before moving to the next step. The amount of traffic directed to the canary version at each step, using a Nth root function, is 0.51%, 6.31%, 15.85%, 39.81%, 100%. That is, to move from step 3 to step 4, 10,000 requests must be forwarded to the canary version, while forwarding only 15.85% of all traffic to the canary version, and at least 60 seconds must elapse in this step even if enough requests are handled earlier.

Comparing these two examples, it can be seen that the complexity rank in the first example is higher than in the second example (100 v. 50)—that is, the first example is a riskier deployment. Hence, more requests must be forwarded in the first example than the second example (100,000 v. 50,000) before fully switching to the canary version. Also, the traffic percentage that is forwarded to the canary version is increased more slowly in the first example (10 steps) than in the second example (5 steps).

A formal canary deployment plan generation can be expressed as follows.

Total number of requests to switch full traffic to canary= [Complexity rank]*[Number of requests per single complexity rank point].

Total time that should be spent in the canary version= [Complexity rank]*[Time per single complexity rank point] seconds.

Number of steps=[Total number of requests to switch full traffic to canary version]/[Number of requests per step].

The time per each step=[Total time that should be spent in the canary version]/[Number of steps]

The final canary deployment plan can be summarized in a form of the following triplet: canary deployment plan= [Number of steps, Number of requests per step, Time per step].

Automatically orchestrating a canary deployment based on a generated canary deployment plan can be implemented as follows. A canary deployment orchestrator can receive a canary deployment plan from a canary plan generator, where the canary deployment plan expresses [Number of steps, Number of requests per step, Time per step].

The canary deployment orchestrator can then execute a canary deployment flow as follows. Per each step, the canary traffic percentage can be determined according to the percentage function (e.g., an Nth root function). Per each successful incoming request to the canary version, the counter of incoming requests per step can be increased. If the counter of incoming requests per step reached [Number of requests per step], and [Time per step] is reached, then the canary deployment orchestrator can move to the next step.

When the last step has finished successfully, all the traffic can be switched to canary version (and the canary version of the microservice can be labeled as production, while the "old" production microservice can be decommissioned).

If the canary deployment operator receives alerts based on user input and determines that there is a problem with the canary deployment, the deployment can be cancelled and 100% of the traffic can be forwarded back to the original production microservices. Through continuous integration/continuous deployment, it can be determined that a result produced by the canary version is likely correct. Problems identified during canary deployment can involve runtime problems, such as whether something is crashing, or there are stability or combability issues.

This operation of a canary deployment orchestrator can be expressed in pseudocode as:

```
foreach num in {1..., Number of steps}
    [Request counter] <- 0
    [Current time in step] <- 0
    canary traffic percentage <- [percentage according to function]
    Traffic split according to [canary traffic percentage]
    foreach [Incoming request]
        if ([Incoming request].status == success)
            [Request counter] <- [Request counter] ++
        if([Request counter] >= [Number of requests per step]
            && [Current time in step] >= [Time per step])
            break;
    if (something crashed || request error>error_threshold)
        Deployment_status=failure
    canary traffic percentage <- 100
    if (deployment status == failure)
        canary traffic percentage <- 0
        decommission canary deployment
```

Example Process Flows

Figure 6:
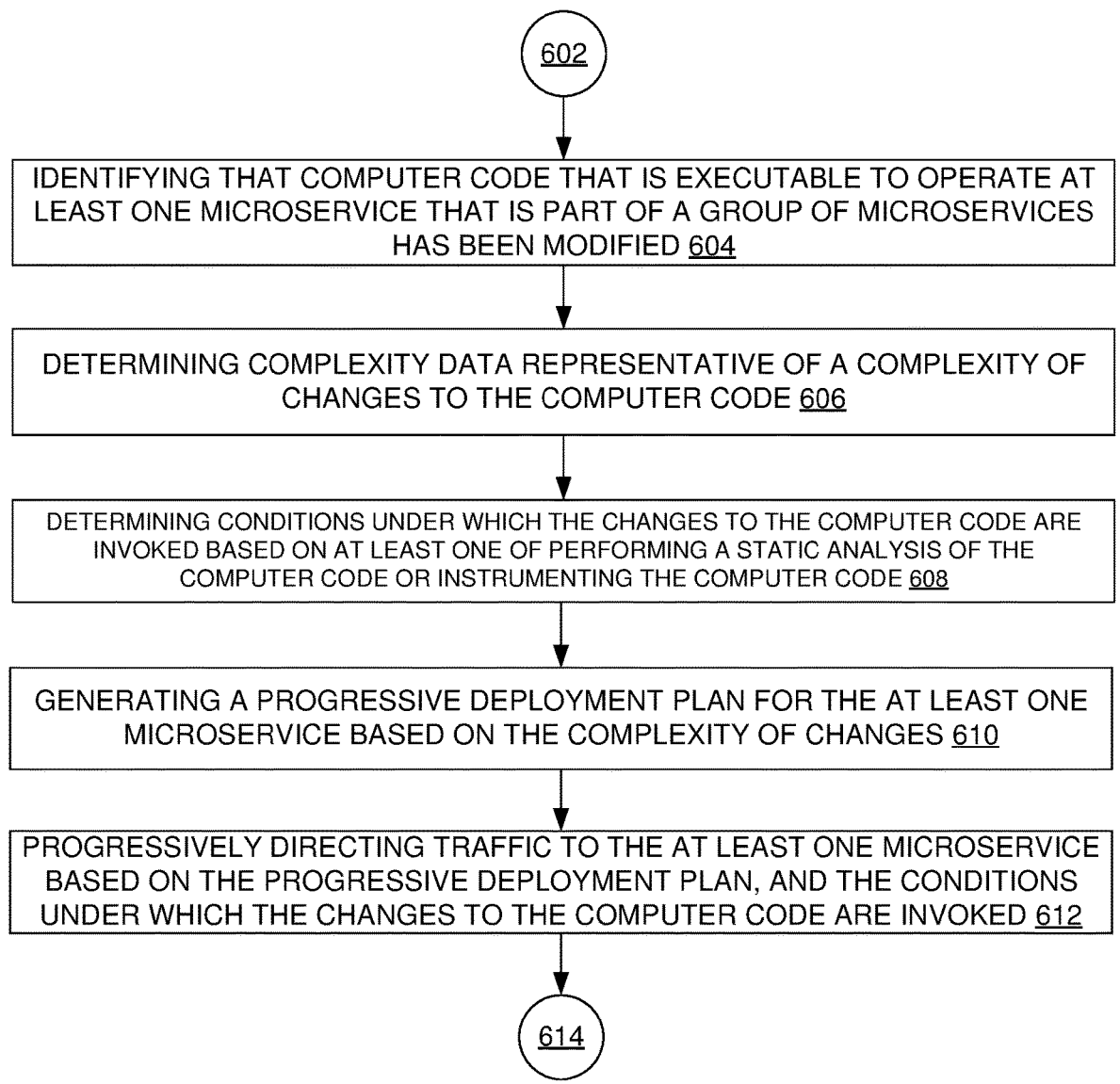
FIG. 6 illustrates an example process flow that can facilitate automatic canary deployments with static analysis and code instrumentation, in accordance with an embodiment of this disclosure.

FIG. 6 illustrates an example process flow 600 that can facilitate automatic canary deployments with static analysis and code instrumentation, in accordance with an embodiment of this disclosure. In some examples, one or more embodiments of process flow 600 can be implemented by system architecture 100 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts identifying that computer code that is executable to operate at least one microservice that is part of a group of microservices has been modified. In some examples, operation 604 can be performed by changeset complexity analyzer component 116 of FIG. 1. In some examples, this determination can be made in response to receiving user input data indicative of implementing a canary deployment on modified or updated computer code.

After operation 604, process flow 600 moves to operation 606.

Operation 606 depicts determining complexity data representative of a complexity of changes to the computer code.

In some examples, the complexity data representative of the complexity of changes comprises a normalized numerical value. That is, the complexity data can be a complexity risk that is normalized to range between 1 and 100.

In some examples, operation 606 comprises determining a number of linearly independent paths through the changes to the computer code. That is, a number of independent paths in a changeset can be evaluated for determining a complexity rank.

In some examples, operation 606 comprises determining a number of classes or interfaces affected by the changes to the computer code. That is, a number of affected classes or interfaces in a changeset can be evaluated for determining a complexity rank.

In some examples, operation 606 comprises determining a number of lines of the computer code affected by the changes to the computer code. That is, a number of modified lines in a changeset (relative to a prior version) can be evaluated for determining a complexity rank.

In some examples, operation 606 comprises determining a number of representational state transfer clients that interact with other microservices of the group of microservices that are affected by the changes to the computer code. That is, a number of REST clients that interact with other microservices in a changeset can be evaluated for determining a complexity rank.

After operation 606, process flow 600 moves to operation 608.

Operation 608 depicts determining conditions under which the changes to the computer code are invoked based on at least one of performing a static analysis of the computer code or instrumenting the computer code. In some examples, operation 608 can be performed by automatic canary deployments with static analysis and code instrumentation component 114 of FIG. 1.

In some examples, performing the static analysis of the computer code comprises analyzing which parts of the computer code are going to be accessed during execution of the computer code, independently of the execution of the computer code. For example, it can be determined from static analysis that parts of the computer code are invoked only where an input value is greater than 5. This can be performed by analyzing the computer code, and without running that computer code as a program.

In some examples, analyzing which parts of the computer code are going to be accessed during the execution of the computer code comprises identifying a group of application programming interface calls of the computer code that are going to be invoked during the execution of the computer code. That is, through static analysis it can be determined which application programming interface calls are invoked under which conditions.

In some examples, instrumenting the computer code comprises executing the computer code to determine which parts of the computer code are accessed during execution of the computer code. In some examples, instrumenting the computer code comprises inserting an instrumentation instruction into the computer code, wherein the instrumentation instruction is configured to identify that the instrumentation instruction has been executed. That is, instrumentation can comprise inserting instrumentation instructions into the computer code that, when executed as part of executing the computer code, generate an indication that they were executed (e.g., incrementing a counter that stores an indication of how many times a particular instrumentation instruction has been executed).

In some examples, instrumenting the computer code comprises removing the instrumentation instruction from the computer code after completing progressively directing the traffic to the at least one microservice. In some examples, instrumenting the computer code comprises disabling the instrumentation instruction from the computer code after completing progressively directing the traffic to the at least one microservice. That is, it can be that the instrumentation code can be removed or disabled after a canary deployment has been performed, and the code (and/or its corresponding executable program) is in production. This can improve performance relative to continuing to execute the instrumentation code. After operation 608, process flow 600 moves to operation 612.

Operation 610 depicts generating a progressive deployment plan for the at least one microservice based on the complexity of changes. In some examples, operation 606 can be performed by canary plan generator component 118 of FIG. 1.

After operation 610, process flow 600 moves to operation 612.

Operation 612 depicts progressively directing traffic to the at least one microservice based on the progressive deployment plan, and the conditions under which the changes to the computer code are invoked. In some examples, operation 608 can be implemented by canary deployment orchestrator component 120.

After operation 612, process flow 600 moves to 614, where process flow 600 ends.

Figure 7:
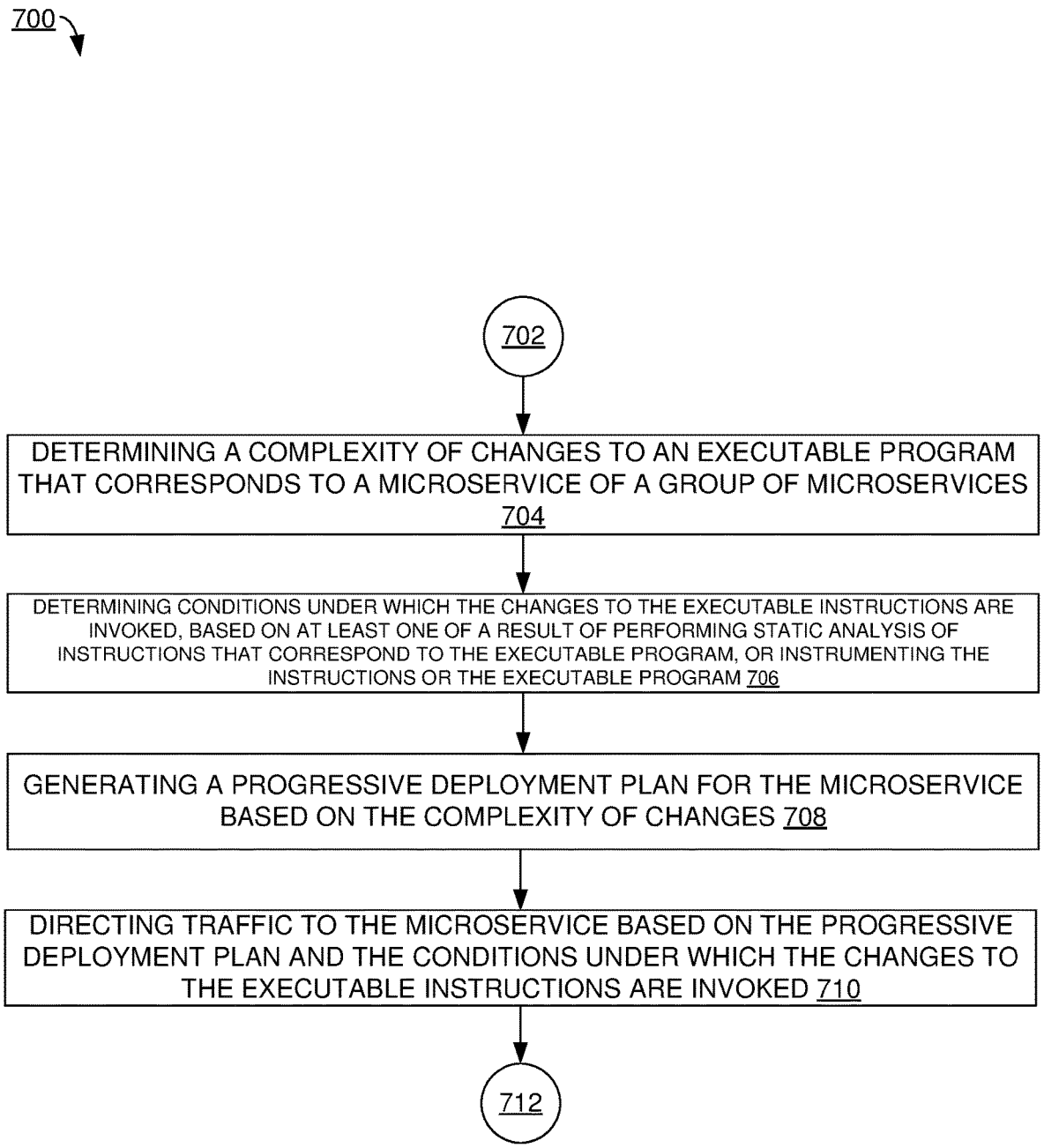
FIG. 7 illustrates an example process flow that can facilitate automatic canary deployments with static analysis and code instrumentation, in accordance with an embodiment of this disclosure.

FIG. 7 illustrates an example process flow 700 that can facilitate automatic canary deployments with static analysis and code instrumentation, in accordance with an embodiment of this disclosure. In some examples, one or more embodiments of process flow 700 can be implemented by system architecture 100 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts determining a complexity of changes to an executable program that corresponds to a microservice of a group of microservices. In some examples, operation 704 can be implemented in a similar manner as operations 604-606 of FIG. 6.

In some examples, the complexity of changes comprises a normalized numerical value. That is, the complexity data can be a complexity risk that is normalized to range between 1 and 100.

After operation 704, process flow 700 moves to operation 706.

Operation 706 depicts determining conditions under which the changes to the executable instructions are invoked, based on at least one of a result of performing static analysis of instructions that correspond to the executable program, or instrumenting the instructions or the executable program. In some examples, operation 706 can be implemented in a similar manner as operation 608 of FIG. 6.

In some examples, performing the static analysis of the instructions comprises identifying, from the instructions and without executing the instructions, a portion of the instructions that is invoked when the instructions is executed.

In some examples, instrumenting the instructions comprises identifying a portion of the instructions that is invoked when executing the executable program. In some examples, instrumenting the instructions or the executable program comprises inserting an instrumentation instruction into the instructions, wherein the instrumentation instruction generates an indication of the instrumentation instruction responsive to being executed.

After operation 706, process flow 700 moves to operation 708.

Operation 708 depicts generating a progressive deployment plan for the microservice based on the complexity of changes. In some examples, operation 708 can be implemented in a similar manner as operation 610 of FIG. 6.

In some examples, the progressive deployment plan comprises a number of steps to perform in directing the traffic to the microservice, and a condition that, when manifested, causes a move to a next step in directing the traffic to the microservice. That is, the progressive deployment plan can comprise a list of steps and conditions to move to a next step in a canary deployment. The progressive deployment plan can be a canary deployment plan as described herein.

In some examples, the condition to move to the next step comprises a number of requests handled by the microservice at a current step in directing the traffic to the microservice. That is, this can specify a counter of a minimum number of requests should be handled at a given step before progressing to a next step.

In some examples, the condition to move to the next step comprises an amount of time spent at a current step in directing the traffic to the microservice. That is, this can specify a minimum amount of time to stay at a given step before progressing to a next step.

After operation 708, process flow 700 moves to operation 710.

Operation 710 depicts directing traffic to the microservice based on the progressive deployment plan and the conditions under which the changes to the executable instructions are invoked. In some examples, operation 710 can be implemented in a similar manner as operation 612 of FIG. 6.

After operation 710, process flow 700 moves to 712, where process flow 700 ends.

Figure 8:
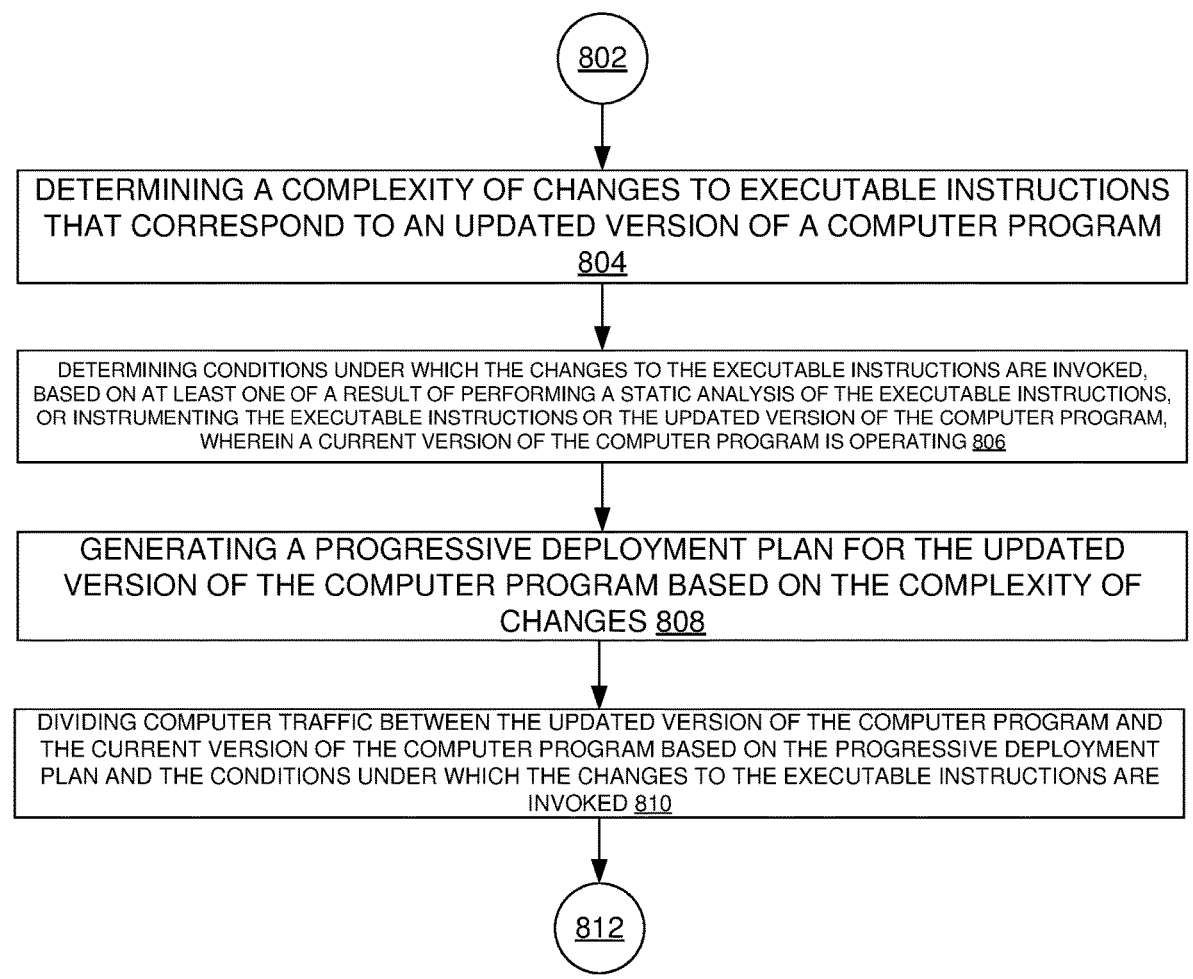
FIG. 8 illustrates an example process flow that can facilitate automatic canary deployments with static analysis and code instrumentation, in accordance with an embodiment of this disclosure.

FIG. 8 illustrates an example process flow 800 that can facilitate automatic canary deployments with static analysis and code instrumentation, in accordance with an embodiment of this disclosure. In some examples, one or more embodiments of process flow 800 can be implemented by system architecture 100 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts determining a complexity of changes to executable instructions that correspond to an updated version of a computer program. In some examples, operation 804 can be implemented in a similar manner as operation 704 of FIG. 7.

After operation 804, process flow 800 moves to operation 806.

Operation 806 depicts determining conditions under which the changes to the executable instructions are invoked, based on at least one of a result of performing a static analysis of the executable instructions, or instrumenting the executable instructions or the updated version of the computer program, wherein a current version of the computer program is operating. In some examples, operation 806 can be implemented in a similar manner as operation 706 of FIG. 7.

In some examples, operation 806 comprises identifying, from the instructions and without executing the instructions, a portion of the instructions that is invoked when the instructions is executed. In some examples, operation 806 comprises identifying a portion of the instructions that is invoked when executing the executable program. In some examples, operation 806 comprises inserting an instrumentation instruction into the instructions, wherein the instrumentation instruction generates an indication of the instrumentation instruction responsive to being executed.

In some examples, instrumenting the instructions or the executable program comprises identifying a location to insert an instrumentation instruction into the instructions based on determining that there is a change in the instructions relative to a prior version of the instructions at the location. That is, instrumentation can be automatically inserted into the code at locations where changes have been made. These changes can be determined from a changeset, which can identify changes in a new version of the code relative to a prior version of the code.

After operation 806, process flow 800 moves to operation 808.

Operation 808 depicts generating a progressive deployment plan for the updated version of the computer program based on the complexity of changes. In some examples, operation 808 can be implemented in a similar manner as operation 708 of FIG. 7.

After operation 808, process flow 800 moves to operation 810.

Operation 810 depicts dividing computer traffic between the updated version of the computer program and the current version of the computer program based on the progressive deployment plan and the conditions under which the changes to the executable instructions are invoked. In some examples, operation 810 can be implemented in a similar manner as operation 710 of FIG. 7.

After operation 810, process flow 800 moves to 812, where process flow 800 ends.

Figure 9:
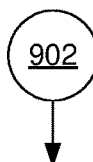
FIG. 9 illustrates an example process flow that can facilitate automatic canary deployments with static analysis and code instrumentation, in accordance with an embodiment of this disclosure.
Figure 9:

FIG. 9 illustrates an example process flow 900 that can facilitate automatic canary deployments with static analysis and code instrumentation, in accordance with an embodiment of this disclosure. In some examples, one or more embodiments of process flow 900 can be implemented by system architecture 100 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, and/or process flow 1000 of FIG. 10.

Process flow 900 begins with 902, and moves to operation 904. Operation 904 depicts performing static analysis of a change to code. Static analysis of the code can be used to determine conditions under which the change will be executed when invoking the code, such as where an input value to an application programming interface call is less than 5.

After operation 904, process flow 900 moves to operation 906.

Operation 906 depicts determining a number of times that the change to the code is invoked based on the static analysis of the change to the code. Take the example of operation 904 where a change is executed when a corresponding application programming interface call is invoked with an input value less than 5. In such examples, operation 906 can comprise determining that the change is invoked where the application programming interface call is invoked with an input value less than 5, and not determining that the change is invoked at other times (such as invoking the application programming interface call an input value of 5 or more).

For example, it can be that the change is to be tested 1,000 times. The application programming interface call that corresponds to the change can be invoked 25,000 times, but where only 1,000 of those times involve an input value less than 5, it can be determined that the change is tested 1,000 times (and not 25,000 times).

After operation 906, process flow 900 moves to 908, where process flow 900 ends.

Figure 10:
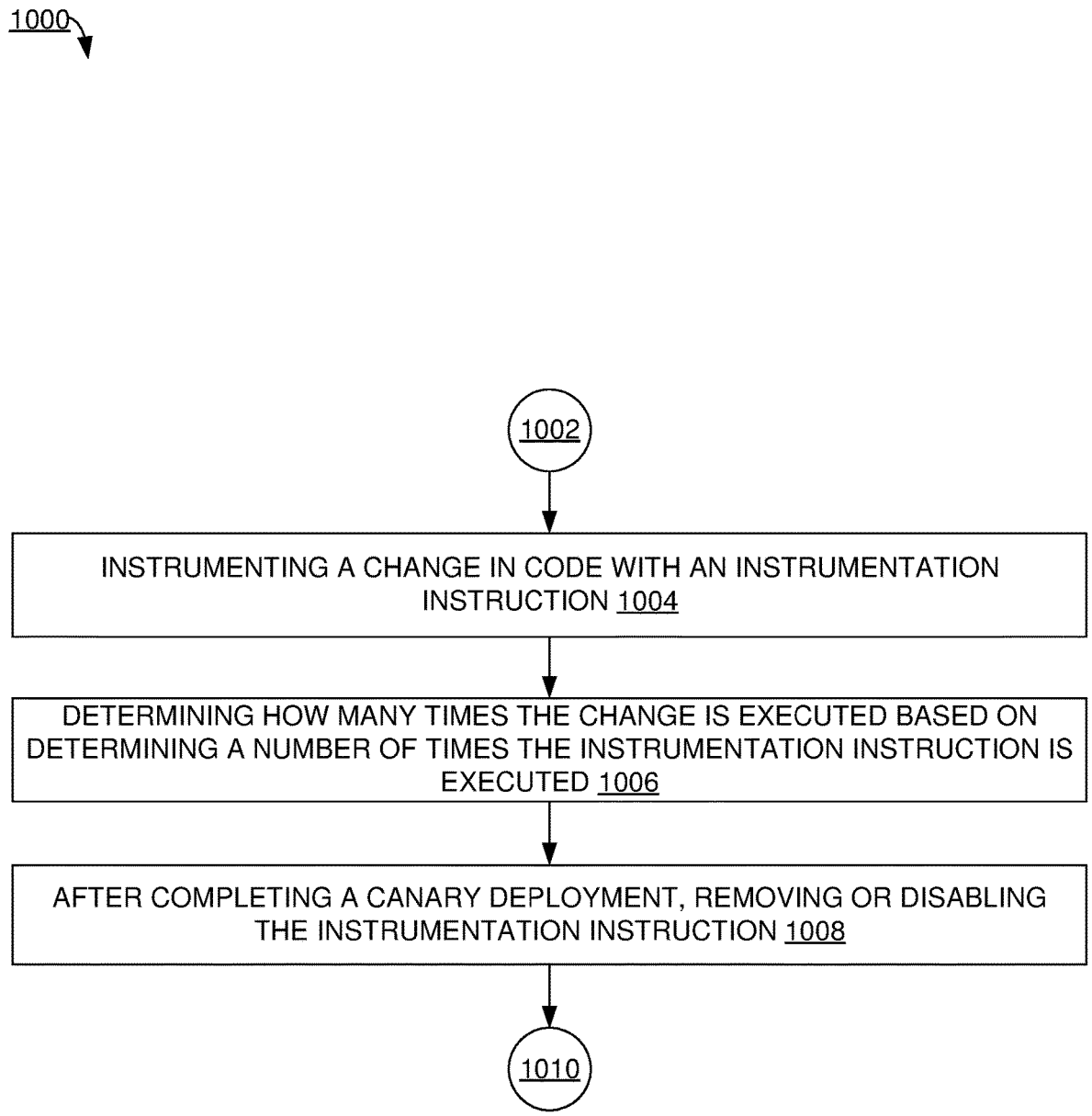
FIG. 10 illustrates an example process flow that can facilitate automatic canary deployments with static analysis and code instrumentation, in accordance with an embodiment of this disclosure.

FIG. 10 illustrates an example process flow 1000 that can facilitate automatic canary deployments with static analysis and code instrumentation, in accordance with an embodiment of this disclosure. In some examples, one or more embodiments of process flow 1000 can be implemented by system architecture 100 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, and/or process flow 900 of FIG. 9.

Process flow 1000 begins with 1002, and moves to operation 1004. Operation 1004 depicts instrumenting a change in code with an instrumentation instruction. That is, an instrumentation instruction can be inserted into code such that it is executed each time a change in the code is executed (e.g., there is not a branch or jump in code between a time that the instrumentation instruction and the change are executed). The instrumentation instruction can indicate how many times it (and therefore the change) is executed, such as by incrementing a counter that tracks how many times the instrumentation instruction is executed.

After operation 1004, process flow 1000 moves to operation 1006.

Operation 1006 depicts determining how many times the change is executed based on determining a number of times the instrumentation instruction is executed. In some examples this can comprise executing an uncompiled version of the code, and in other examples this can comprise compiling the code and executing the resulting executable. The indication from the instrumentation instruction of how many times the change has been executed (e.g., a value stored in a counter) can indicate how many times the change is executed.

After operation 1006, process flow 1000 moves to operation 1008.

Operation 1008 depicts, after completing a canary deployment, removing or disabling the instrumentation instruction. It can be that a canary deployment is used to determine that there is not a problem with the changes. At the conclusion of a canary deployment, all traffic can be directed to a new version of a service (and none to the prior version). In such a case, continuing to execute the instrumentation can lower performance of the service. To mitigate against this, the instrumentation code can be removed (such as being removed from the code and recompiling the code) or disabled (such as by changing a flag that indicates whether to execute the instrumentation code from TRUE to FALSE).

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server 102 and/or client 106 of FIG. 1.

In some examples, computing environment 1100 can implement one or more embodiments of the process flows of FIGS. 6-10 to automatic canary deployments with static analysis and code instrumentation.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
   identifying that computer code that is executable to operate at least one microservice that is part of a group of microservices has been modified;
   determining complexity data representative of a complexity of changes to the computer code;
   determining conditions under which the changes to the computer code are invoked based on at least one of performing a static analysis of the computer code or instrumenting the computer code;

generating a progressive deployment plan for the at least one microservice based on the complexity of changes; and progressively directing traffic, using at least one proxy executing in a service mesh, to the at least one microservice based on the progressive deployment plan, and the conditions under which the changes to the computer code are invoked.

2. The system of claim 1, wherein performing the static analysis of the computer code comprises:

analyzing which parts of the computer code are going to be accessed during execution of the computer code, independently of the execution of the computer code.

3. The system of claim 2, wherein analyzing which parts of the computer code are going to be accessed during the execution of the computer code comprises:

identifying a group of application programming interface calls of the computer code that are going to be invoked during the execution of the computer code.

4. The system of claim 1, wherein instrumenting the computer code comprises:

executing the computer code to determine which parts of the computer code are accessed during execution of the computer code.

5. The system of claim 1, wherein instrumenting the computer code comprises:

inserting an instrumentation instruction into the computer code, wherein the instrumentation instruction is configured to identify that the instrumentation instruction has been executed.

6. The system of claim 5, wherein the operations further comprise:

removing the instrumentation instruction from the computer code after completing the progressively directing of the traffic to the at least one microservice.

7. The system of claim 5, wherein the operations further comprise:

disabling the instrumentation instruction from the computer code after completing the progressively directing of the traffic to the at least one microservice.

8. A method, comprising:

determining, by a system comprising at least one processor, a complexity of changes to an executable program that corresponds to a microservice of a group of microservices;

determining conditions under which the changes to the executable program are invoked, based on at least one of:
a result of performing static analysis of instructions that correspond to the executable program, or
instrumenting the instructions or the executable program;

generating, by the system, a progressive deployment plan for the microservice based on the complexity of changes; and directing, using at least one proxy executing in a service mesh, traffic to the microservice based on the progressive deployment plan and the conditions under which the changes to the executable program are invoked.

9. The method of claim 8, wherein performing the static analysis of the instructions comprises:

identifying, by the system from the instructions and without executing the instructions, a portion of the instructions that is invoked when the instructions are executed.

10. The method of claim 8, wherein instrumenting the instructions or the executable program comprises:

identifying, by the system, a portion of the instructions that is invoked when executing the executable program.

11. The method of claim 8, wherein instrumenting the instructions or the executable program comprises:

inserting, by the system, an instrumentation instruction into the instructions, wherein the instrumentation instruction generates an indication of the instrumentation instruction responsive to being executed.

12. The method of claim 8, wherein instrumenting the instructions or the executable program comprises:

identifying, by the system, a location to insert an instrumentation instruction into the instructions based on determining that there is a change in the instructions relative to a prior version of the instructions at the location.

13. The method of claim 8, wherein the complexity of changes comprises a normalized numerical value.

14. The method of claim 8, wherein the progressive deployment plan comprises a number of steps to perform in directing the traffic to the microservice, and a condition that, when manifested, causes a move to a next step in directing the traffic to the microservice.

15. The method of claim 14, wherein the condition that causes the move to the next step comprises at least a number of requests having been handled by the microservice at a current step in directing the traffic to the microservice, or at least an amount of time having been spent at a current step in directing the traffic to the microservice.

16. A non-transitory computer-readable medium comprising instructions that, in response to execution, cause a system comprising at least one processor to facilitate execution of a computing service to perform operations, comprising:

determining a complexity of changes to executable instructions that correspond to an updated version of a computer program;

determining conditions under which the changes to the executable instructions are invoked, based on at least one of:
a result of performing a static analysis of the executable instructions, or
instrumenting the executable instructions or the updated version of the computer program,
wherein a current version of the computer program is operating;

generating a progressive deployment plan for the updated version of the computer program based on the complexity of changes; and dividing, using at least one proxy executing in a service mesh, computer traffic between the updated version of the computer program and the current version of the computer program based on the progressive deployment plan and the conditions under which the changes to the executable instructions are invoked.

17. The non-transitory computer-readable medium of claim 16, wherein the progressive deployment plan indicates a monotonically increasing percentage of traffic directed to the updated version of the computer program relative to the current version of the computer program.

18. The non-transitory computer-readable medium of claim 16, wherein the operations further comprise:

determining that a metric of the changes to the executable instructions has a value that exceeds an upper limit threshold value; and determining a weighted metric for the metric using the upper limit threshold value.

19. The non-transitory computer-readable medium of claim 16, wherein the operations further comprise:
- determining that a metric of the changes to the executable instructions has a value that is less than a lower limit threshold value; and
- determining a weighted metric for the metric using the lower limit threshold value.

20. The non-transitory computer-readable medium of claim 16, wherein the operations further comprise:
- determining that a metric of the changes to the executable instructions has a value that is greater than a minimum threshold value and less than a maximum threshold value; and
- determining a weighted metric for the metric using the value of the metric.

* * * * *